United States Patent [19]

Bumb, Jr.

[11] 3,782,659

[45] Jan. 1, 1974

[54] TAPE TRANSPORT DUAL REEL DRIVE FROM SINGLE CAPSTAN

[75] Inventor: Frank C. Bumb, Jr., San Gabriel, Calif.

[73] Assignee: California Data Machines, Van Nuys, Calif.

[22] Filed: Mar. 6, 1972

[21] Appl. No.: 232,139

[52] U.S. Cl. .................................. 242/201, 274/4 D

[51] Int. Cl. ......................... B11b 15/32, G03b 1/04

[58] Field of Search....... 242/200–205, 67.4, 67.5, 196; 74/216.5, 217; 274/4 R, 4 D; 226/49

[56] References Cited

UNITED STATES PATENTS

| | | | |
|---|---|---|---|
| 2,705,639 | 4/1955 | Lekas | 274/4 D |
| 3,072,352 | 1/1963 | Loewe | 242/202 |
| 2,706,637 | 4/1955 | Cain | 274/4 R |

*Primary Examiner*—Leonard D. Christian
*Attorney*—William W. Haefliger et al.

[57] ABSTRACT

A tape transport comprises first and second rotary elements for respectively rotating carriers for tape rolls between which the tape is to be transported; a rotary capstan unit engageable by the transported tape; and means including belting operatively connected in driven relation with the capstan unit and driving relation with the rotary elements for effecting driving of the carriers at speeds characterized in that the tape being transported onto one of the rolls, and also the tape transported off the other roll, is maintained in tension.

9 Claims, 4 Drawing Figures

TAPE TRANSPORT DUAL REEL DRIVE FROM SINGLE CAPSTAN

BACKGROUND OF THE INVENTION

This invention relates generally to transport equipment for webs or tapes, and more particularly concerns improvements in reel-to-reel drives associated with such equipment.

Digital tape units used for input/output equipment in small computers, data terminals, source data acquisition and numerical control all require cartridge or cassette and/or reel-to-reel tape units with precise tape tracking and acceleration characteristics. Acceleration requirements at the record head or heads in such equipment are generally in the range of 500–3,000 inches per second per second, resulting in a short, controlled acceleration of the tape to record speed, and a similar short, controlled deceleration to stop. The conventional design approach, as for example in tape transports using an IBM standard reel and recording a standard IBM format, makes use of one servo to drive the tape capstan and additional and separate servos to drive the tape reels. At the present time, such systems which employ a 7 or 8 ½ inches outside diameter reel accelerate to record speeds of 12.5 inches per second or 25 inches per second within approximately one-half of an interrecord gap. While this design concept is straight forward and results in the production of equipment that performs adequately, there is sufficient complexity of required equipment that it is very difficult to reduce manufacturing costs simply by reducing the component costs in the three drive servo systems which are needed.

Efforts have been made to develop tape cassettes and drives for the above discussed application, and in particular modifications have been made in cassette systems of the Philips type developed for the audio market to enhance reliability. In such systems, two reels mounting tape packs or rolls are enclosed in the cassette case, the reels then being driven by various means such as drag clutches operating from reel motors, and clutches driven from power derived at the capstan drive source. The supply pack is typically held back, i.e., restrained against rotation, by frictional drag clutch means or the like. The capstans are driven from constant speed sources through electro-clutches characterized as fast energizing, or have fast energizing solenoids actuate pressure rollers against constantly rotating capstans. Such drive systems are characterized by undesirable complexity increasing cost and the risk of malfunction; also, they are somewhat unreliable and have undesirably limited life.

SUMMARY OF THE INVENTION

It is a major object of the invention to provide a tape transport dual reel drive system characterized as overcoming the above as well as other problems encountered in conventional drives. It is another object of the invention to provide a drive system for tape transports providing unusual simplicity and reliability and offering a means for reducing substantially the cost of manufacture of such system.

Basically, the invention is embodied in a tape transport that comprises first and second rotary elements for respectively rotating carriers for tape rolls between which the tape is to be transported; a rotary capstan unit engageable by the transported tape; and means including certain belting. operatively connected in driven relation with the capstan unit and driving relation with the elements for effecting driving of the carriers at speeds characterized in that the tape being transported onto one of the rolls, and also the tape transported off the other roll, is maintained in tension. As will be seen, this particular combination under which tape transport is controlled by the capstan unit, and also by the capstan drive of the tape roll mounting reels, enables transmission of all necessary drive through one capstan unit, which may be driven by a single motor, thereby resulting in great simplicity, cost reduction and enhanced reliability, the system drive also being fully reversible.

Further, the aforesaid means may with unusual advantage include pulley mechanism driven by the capstan unit and driving the certain belting referred to, which may be lengthwise elastic for imparting torgue to tension the tape; the speeds of the carriers driven by the belt driven elements (as for example carrier drive posts) may typically be characterized in that the circumferential velocity of the wind-up tape roll tends to exceed the circumferential velocity of the roll from which tape is driving unwound; a single belt may be used to drive both elements from the pulley mechanism, other belting being usuable to couple the capstan unity in driving relation with the pulley mechanism; and the tape may typically have non-slip engagement with the capstan unit.

In addition, and as will be seen, the invention in one of its forms may comprise pulley mechanism incorporating first and second pulley units, the certain belting coupling to the first pulley unit in traveling in one direction between the carrier driving elements and coupling to the second pulley unit in traveling in the opposite direction between those elements; there being additional belting connected in driven relation with the first pulley unit and in driving relation with the second pulley unit. The invention in another of its forms may comprise pulley mechanism incorporating a pair of differential diameter drums, one of which drives a first belt coupled with both of the carrier driving elements, and a second of which drives a second belt coupled with both of those elements. Such drums may be integrally connected to rotate at the same angular velocity, the first and second belts engaging the drums so that the first belt travels off one drum and toward one of the elements while the second belt travels off the other drum and toward the other element.

These and other objects and advantages of the invention, as well as the details of illustrative embodiments, will be more fully understood from the following detailed description of the drawings, in which:

DRAWING DESCRIPTION

DETAILED DESCRIPTION

Figure 1:
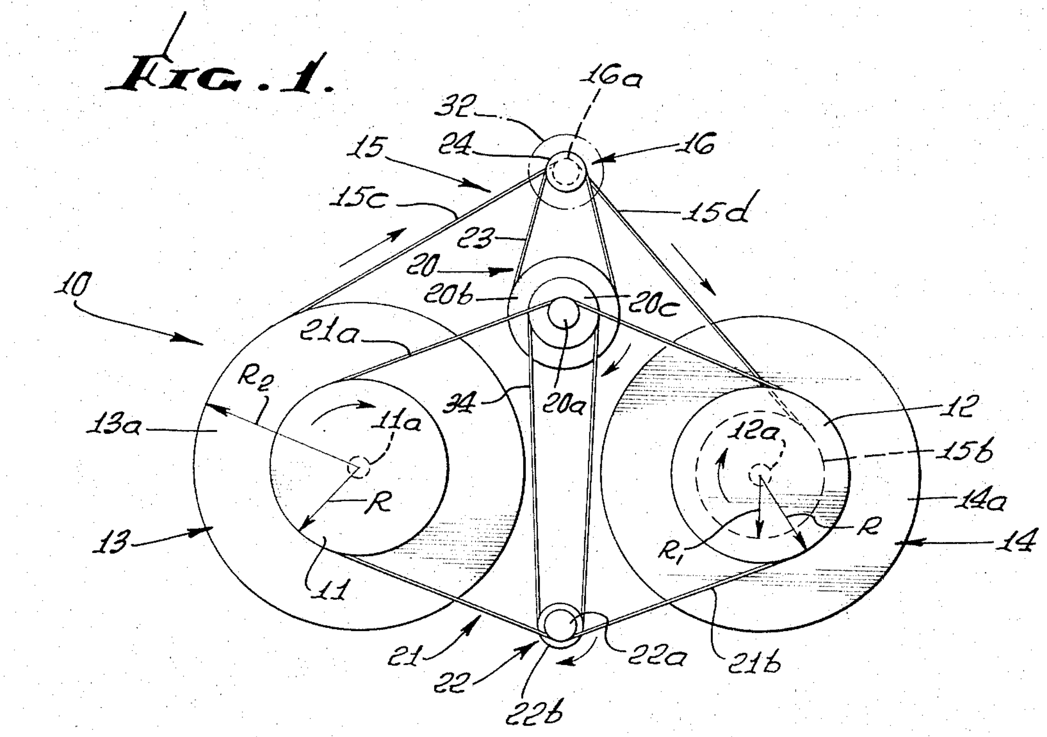
FIG. 1 is a plan view of a first embodiment of the invention.
Figure 2:
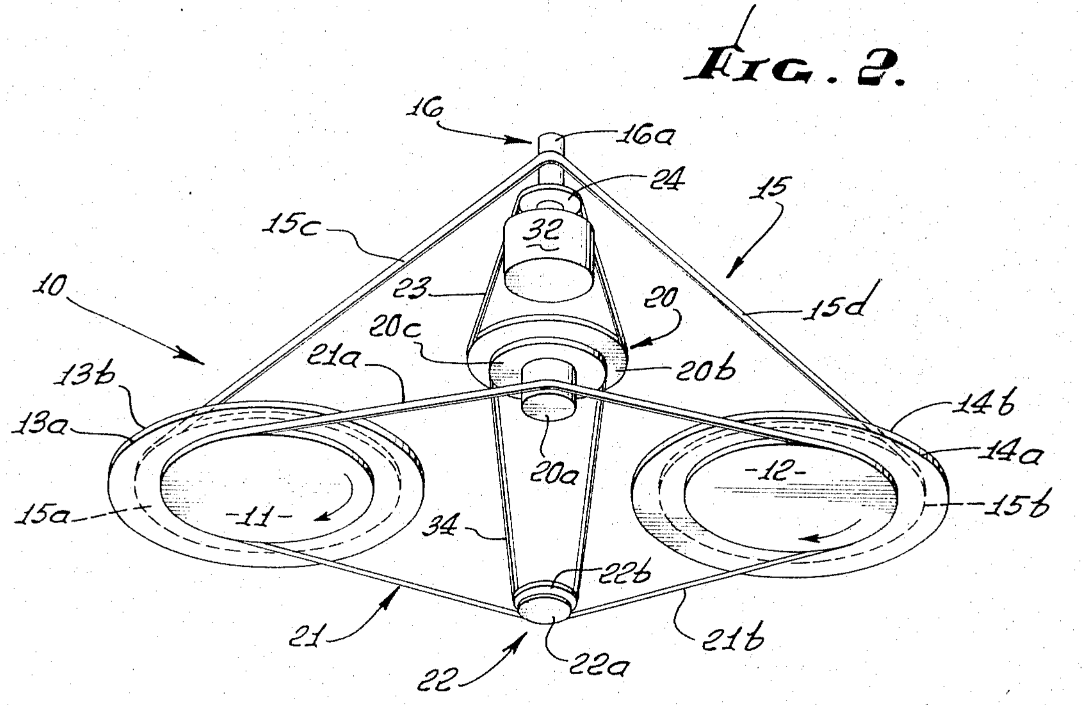
FIG. 2 is a perspective showing of the FIG. 1 embodiment.

Referring first to FIGS. 1 and 2, they show a tape transport 10, incorporating first and second rotary elements, such as drums 11 and 12, for respectively rotating carriers 13 and 14 for tape rolls or packs 15*a* and 15*b* between which the tape 15 is to be transported; a rotary capstan unit 16 engagable by the transported tape 15; and drive means including certain belting operatively connected in driven relation with the capstan unit and driving relation with the elements or drums 11 and 12 for effecting driving of the reels at speeds characterized in that the tape being transported onto one of the rolls is maintained in tension. As illustrated, the drums 11 and 12 may be suitably directly coupled to the carriers, as for example by drum stub shafts 11*a* and 12*a* to which the carriers are releasably attached. Shafts 11*a* and 12*a* may also be considered to represent clutches, where such are used. The carriers themselves may comprise reels provided with spaced flanges 13*a* and 13*b*, and 14*a* and 14*b* between which the tape feeds.

Alternatively, the carriers may simply comprise flangeless rotors, and they may be connected with drums 11 and 12 via non-rigid couplings, such as slip clutches, the choice of coupling technique depending upon the elastic qualities of the belting to be described, the allowable varation in tape tension and the size of the tape rolls.

The capstan unit 16 may include a drum part 16*a* having a drive diameter D engaged by the tape in non-slip relation wehreby the capstan determines the velocity V of the tape and the tape velocity profile (acceleration) versus time. If desired, the assembly may be configured so that the tape has a relatively large angle (over ) of wrap around the capstan part 16*a* to facilitate such non-slip relationship, or a pinch roller may be used to hold the tape in that relation.

The drive means referred to above, may generally include pulley mechanism driven by the capstan unit and driving the certain belting, which may advantageously be lengthwise elastic. In this regard, the operation of the drive means for the rotary elements 11 and 12 serves to drive the carriers at speeds characterized in that the circumferential velocity $V + \Delta V$ of the tape roll or pack winding the tape (roll 15*b* in FIG. 2) exceeds slightly the circumferential velocity of the tape roll or pack from which the tape is being unwound (roll 15*a* in FIG. 2). Also, the circumferential velocity of the roll 15*b* in FIG. 2 preferably exceeds slightly the circumferential velocity V of the capstan drum part 16*a*, the latter providing hold-back force exerted on the tape. Further, the circumferential velocity $V - \Delta V$ of the supply roll 15*a* is preferably slightly less than the circumferential velocity V of the capstan part 16*a*. Accordingly, the tape legs 15*c* and 15d are always maintained in tension. Further, that portion of belt 21 wrapped on drum 11 tends to move a little slower than the drum 11 itself turns, when full; and that portion of belt 21 wrapped on drum 12 tends to travel a little faster than drum 12 itself turns. This then imparts a retarding torque to drum 11, which results in and balances the tension in tape leg 15*c*, and imparts a forward torque to drum 12, which results in and balances the tension in tape legs 15*d*. Lengthwise elasticity of the belting referred to above constitutes the preferred way in which such tape tension maintenance may be accomplished.

Further with respect to the drive means, the capstan driven pulley mechanism may include a first pulley unit 20 having a pulley 20*a* in non-slip engagement with the leg 21*a* of the above mentioned certain belting 21, and a second pulley unit 22 having a pulley 22*a* in non-slip engagement with the leg 21*b* of the belting 21.

Another belt 23 is driven by the capstan unit drum 24 and drives the pulley unit 20 via drum 20*b* thereof; and an additional belt 34 is driven by drum 20*c* of unit 20, and drives drum 22*b* of unit 22. The operation is such that the circumferential velocity of the belt leg 21*b* on drum 22*a* is higher than the circumferential velocity of the belt leg 21*a* on the drum 20*a* of pulley unit 20; accordingly, the elastic belt 21 is elongated in going from pulley unit 20 around the take-up roll radius R, and then onto pulley unit 22.

This elongation causes the take-up roll 15*b* to run substantially faster than the supply roll 15*a* in terms of roll surface velocities. The exact difference depends upon the torque delivered from the belt stretch, and the elongation of the tape due to such torque. For example, if the maximum supply radius divided by the minimum supply radius is 2:1, the take-up roll would run slightly greater than twice as fast as the supply roll at the beginning of tape transport (from a full supply roll). This large velocity difference requires substantial elongation in belt 21. It should be understood that the transport of FIGS. 1 and 2 is reversible, the same principles of operation being applicable.

The 2:1 ratio reference to above would apply for small digital machines using Philips type cassettes. In certain other applications, a smaller ratio of maximum roll radius to minimum roll radius (i.e., 1.4 to 1.7 ) would be used. For smaller ratios, such as 1.1 to 1.2, slip clutches would be of less importance. System modifications would include the use of dual capstans, and compliance of buffer storage of the tape between the capstan and take-up roll, and between the capstan and the supply roll. The latter is of more importance where maximum acceleration is desired. For example, when the capstan is driven by a high performance servomotor-amplifier-tachometer system, the supply and takeup tape carrier motion will lag the capstan motion because of belt elasticity; in this case, a simple spring-loaded storage arm assembly may be used to provide buffer storage for the tape until the carriers or reels come up to speed. Such an arm is shown at 225 in my U.S. Letters Pat. No. 3,528,626.

FIG. 2 shows the capstan unit 16 driven by a servomotor 32. The capstan could be driven from a motor via a belt, if desired, and such a system would have high inertia to reduce wow and flutter as is desirable in present cassette recorders to reduce cost and improve reliability. The system of the invention is also applicable to incremental recorders in the digital field.

Figure 3:
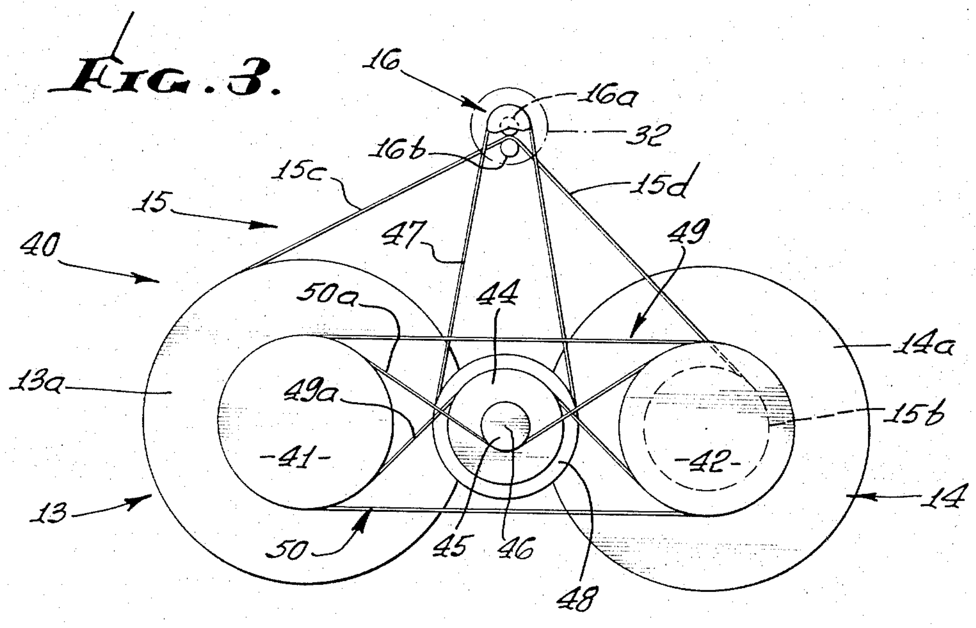
FIG. 3 is a plan view of a second embodiment of the invention.
Figure 4:
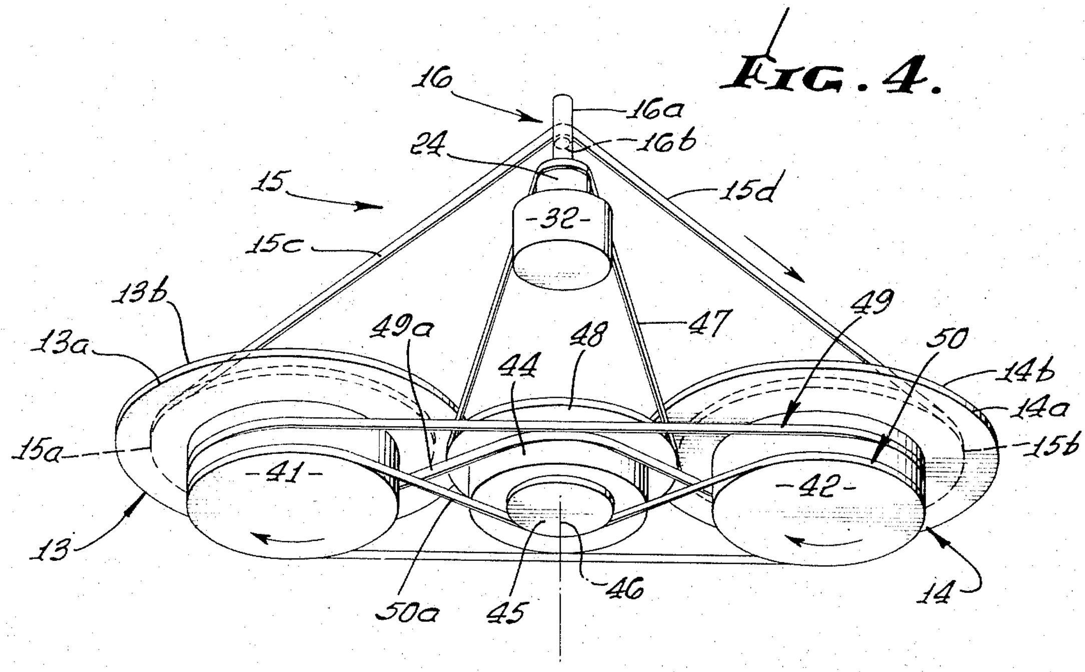
FIG. 4 is a perspective showing of the FIG. 3 embodiment.

Turning to the assembly 40 of FIGS. 3 and 4, the capstan unit, tape and tape carriers have the same arrangement, and therefore bear the same numbers, as in FIGS. 1 and 2. The first and second rotary elements or drums 41 and 42 of FIGS. 3 and 4 correspond to elements 11 and 12 respectively in FIGS. 1 and 2.

The drive means again includes certain belting operatively connected in driven relation with the capstan unit and driving relation with the tape carrier rotating elements 41 and 42 for effecting driving of the carriers at speeds characterized in that the tape being transported onto one of the rolls is maintained in tension. Also, the drive means again includes pulley mechanism driven by the rotation unit, the referred to "certain belting being driven by the pulley mechanism and being lengthwise elastic.

As shown in FIGS. 3 and 4, the pulley mechanism includes a pair of differential diameter rotors or drums, 44 and 45, which may be integrally connected to rotate at the same angular velocity about the axis 46. For this purpose a belt 47 driven by capstan unit drum 24 drives the drum 48 integral and coaxial with drums 44 and 45.

The "certain belting in this embodiment includes a first belt 49 having a leg **49*a* driven by one of the differential diameter drums (drum 44 for example) and a second belt 50 having a leg 50*a* driven by the other of the differential diameter drums (drum 45 for example), both such belts being coupled with the rotors 41 and 42 as shown. Leg 49*a* is located to travel off drum 44 toward one of the rotors (say rotor 42), whereas leg 50*a* is located to travel off drum 45 toward the other of the rotors (say rotor 41). Since rotors or hub elements 41 and 42 have the same diameter, and since the belts, 49 and 50, are elastic and have non-slip engagement with the rotors 41 and 42 and with the drums 44 and 45, velocity differentials are created causing the take-up roll (15*b* for example) to rotate slightly faster than the capstan part 16*a*, and causing the supply roll (15*a* for example) to rotate slightly slower than the tape engaged capstan part 16*a*. A pinch roller 16*b* holds the tape 15 against part 16*a*.** Since the system is bi-directional, the same principles exist in reverse mode of operation.

I claim:

1. In a tape transport, the combination comprising a. first and second rotary elements for respectively rotating carriers for tape rolls between which the tape is to be transported.

b. a rotary capstan unit engageable by the transported tape, c. means including certain belting operatively connected in driven relation with the capstan unit and driving relation with said elements for effecting driving of the carriers at speeds characterized in that the tape being transported onto one of said rolls is maintained in tension, and d. said means including first and second pulley units and said certain belting coupling to said first pulley unit in traveling in one direction between said elements and coupling to said second pulley unit in traveling in the opposite direction between said elements, said certain belting being lengthwise elastic, said means including other belting connected in driven relation with the capstan and driving relation with said first pulley unit, and said means including additional belting connected in driven relation with said first pulley unit and in driving relation with said second pulley unit.

2. The transport of claim 1 including said carriers coupled to said elements, and said tape rolls on said carriers.

3. The transport of claim 2 wherein the carrier speeds are characterized in that the circumferential velocity of the roll winding up the tape exceeds the circumferential velocity of the roll from which tape is being unwound.

4. The transport of claim 2 wherein the circumferential velocity of the roll winding up the tape slightly exceeds the circumferential velocity of the capstan unit surface engaged by the tape.

5. The transport of claim 2 wherein the circumferential velocity of the roll from which the tape is being unwound is slightly less than the capstan unit surface engaged by the tape.

6. The transport of claim 1 wherein said certain belting comprises a single belt driving both of said elements.

7. The transport of claim 2 wherein the tape has non-slip engagement with the capstan unit.

8. In a tape transport, the combination comprising a. first and second rotary elements for respectively rotating carriers for tape rolls between which the tape is to be transported, b. a rotary capstan unit engageable by the transported tape, c. means including certain belting operatively connected in driven relation with the capstan unit and driving relation with said elements for effecting driving of the carriers at speeds characterized in that the tape being transported onto one of said rolls is maintained in tension, said means including pulley mechanism driven by the capstan unit, said certain belting being driven by said pulley mechanism and being lengthwise elastic, and d. said pulley mechanism including a pair of differential diameter drums, said certain belting including a first belt driven by one of said drums and coupled with both said elements, and a second belt driven by the other of said drums, and coupled with both said elements.

9. The transport of claim 8 wherein the drums are integrally connected to rotate at the same angular velocity, and the first and second belts engage the drums so that the first belt travels off the one drum toward one of said elements while the second belt travels off said other drum and toward the other element.

* * * * *